United States Patent
Huang

(10) Patent No.: US 8,369,815 B2
(45) Date of Patent: Feb. 5, 2013

(54) METHOD FOR SPECTRUM NOISE DETECTION

(75) Inventor: Kung-Piao Huang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 283 days.

(21) Appl. No.: 12/912,845

(22) Filed: Oct. 27, 2010

(65) Prior Publication Data

US 2011/0151801 A1    Jun. 23, 2011

(30) Foreign Application Priority Data

Dec. 18, 2009    (TW) .............................. 98143646 A

(51) Int. Cl.
*H04B 1/10* (2006.01)
*H04B 17/00* (2006.01)
(52) U.S. Cl. .................. 455/296; 455/67.13; 455/67.11
(58) Field of Classification Search .................. 455/434, 455/418, 450, 222, 213, 218, 295, 512, 296, 455/226.1, 234.1, 553.1, 205, 249.1, 67.13, 455/67.11, 63.1, 570, 562.1, 102
See application file for complete search history.

(56) References Cited

U.S. PATENT DOCUMENTS

| | | | |
|---|---|---|---|
| 2005/0227626 A1* | 10/2005 | Stoddard et al. | 455/67.11 |
| 2008/0045175 A1* | 2/2008 | Yoon et al. | 455/188.1 |
| 2010/0075704 A1* | 3/2010 | McHenry et al. | 455/509 |

* cited by examiner

*Primary Examiner* — Nay A Maung
*Assistant Examiner* — Cindy Trandai
(74) *Attorney, Agent, or Firm* — Rabin & Berdo, P.C.

(57) ABSTRACT

A method for spectrum noise detection is provided. Means and a total mean of spectrum blocks of a frequency-domain signal are calculated. Whether the means are greater than a cut-off threshold is checked. If all the means are greater than the cut-off threshold, whether the means range between a variance lower bound and a variance upper bound is checked, an estimation bandwidth corresponding to the spectrum blocks is obtained according to a bandwidth check threshold, and whether a central frequency of the estimation bandwidth approximates a central frequency of the spectrum of the frequency-domain signal is checked. If the number of the means ranging between the variance lower bound and the variance upper bound exceeds a default value, and the estimation bandwidth is greater than a predetermined bandwidth and the central frequency of the estimation bandwidth approximates the central frequency, the frequency-domain signal is determined as a noise signal.

8 Claims, 5 Drawing Sheets

METHOD FOR SPECTRUM NOISE DETECTION

This application claims the benefit of Taiwan application Serial No. 98143646, filed Dec. 18, 2009, the subject matter of which is incorporated herein by reference.

BACKGROUND OF THE INVENTION

1. Field of the Invention

The invention relates in general to a method for spectrum noise detection, and more particularly to a high efficiency method for spectrum noise detection.

2. Description of the Related Art

Regarding the satellite television broadcast, an earth-synchronous satellite disposed above the equator firstly receives the radio frequency signal of the television station on the ground, and then forwards the signal to the prescribed zone on the earth, and the apparatus on the ground receives the signal for the television. Recently, the digital satellite television (e.g., DVB-S mainly used in Europe) is rapidly developed, wherein the earth-synchronous satellite directly transmits the digital, encoded and compressed radio frequency signal to the client. The receiver of the client receives the radio frequency signal and then performs the blind scan to perform the channel search. However, the radio frequency signal contains many noise signals in addition to the channel signals. Therefore, when the blind scan is performed, the demodulator in the receiver has to demodulate the noise signals and then determine the demodulated signals as the channel signals or the noise signals. Consequently, the performance of channel search is greatly reduced, and the overall performance of the receiver is affected.

SUMMARY OF THE INVENTION

The invention is directed to a method for spectrum noise detection, wherein a spectrum noise signal is found by the simple determining method so that the spectrum noise signal may be eliminated in advance and the overall performance of a receiver can be enhanced.

According to a first aspect of the present invention, a method for spectrum noise detection is provided. The method includes the following steps. A spectrum of a frequency-domain signal is sliced into a plurality of spectrum blocks, and a mean of each of the spectrum blocks and a total mean of the spectrum blocks are calculated. A cut-off threshold, a bandwidth check threshold, a variance lower bound and a variance upper bound, which are sorted in an ascending manner, are calculated according to the total mean. Whether the means are greater than the cut-off threshold is checked. Whether the means range between the variance lower bound and the variance upper bound is checked if the means are greater than the cut-off threshold, and an estimation bandwidth corresponding to the spectrum blocks is obtained according to the bandwidth check threshold. Whether a central frequency of the estimation bandwidth approximates a central frequency of the spectrum of the frequency-domain signal, and whether the estimation bandwidth is greater than a predetermined bandwidth are checked. The frequency-domain signal is determined as a noise signal if the number of the means ranging between the variance lower bound and the variance upper bound exceeds a default value, and the central frequency of the estimation bandwidth approximates the central frequency of the spectrum of the frequency-domain signal and the estimation bandwidth is greater than the predetermined bandwidth.

The invention will become apparent from the following detailed description of the preferred but non-limiting embodiments. The following description is made with reference to the accompanying drawings.

DETAILED DESCRIPTION OF THE INVENTION

The invention provides a method for spectrum noise detection, wherein a spectrum noise signal is found by the simple determining method so that the spectrum noise signal may be eliminated in advance and the overall performance of a receiver can be enhanced.

Figure 1:
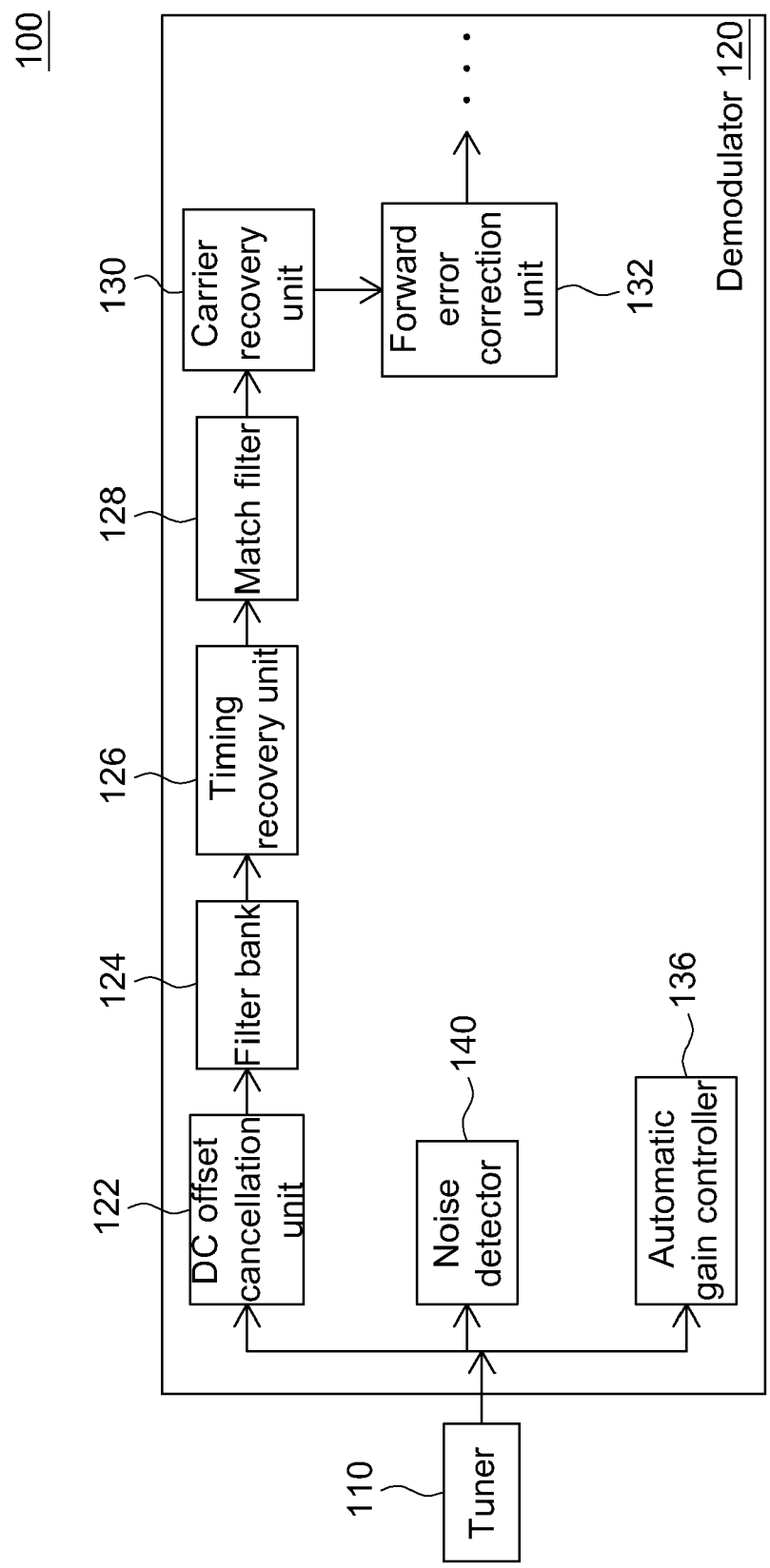
FIG. 1 is a functional block diagram showing a receiver according to a preferred embodiment of the invention.

FIG. 1 is a functional block diagram showing a receiver 100 according to a preferred embodiment of the invention. Referring to FIG. 1, the receiver 100 includes a tuner 110, a demodulator 120 and a post end circuit thereof (not shown). The demodulator 120 includes, for example, a noise detector 140 and many circuit elements, such as a DC offset cancellation unit 122, a filter bank 124, a timing recovery unit 126, a match filter 128, a carrier recovery unit 130, a forward error correction unit 132 and an automatic gain controller (AGC) 136. In the prior art, the demodulator 120 cannot determine the demodulated signal as the noise signal rather than the channel signal until the noise signal is processed by the circuit elements 122 to 132, and then the noise signal is eliminated so that the performance of channel search is significantly reduced. However, the demodulator 120 of this embodiment utilizes the noise detector 140 to determine whether the received signal is the channel signal or the noise signal so that the noise can be eliminated in advance and the overall performance of the receiver 100 can be enhanced.

Figure 2:
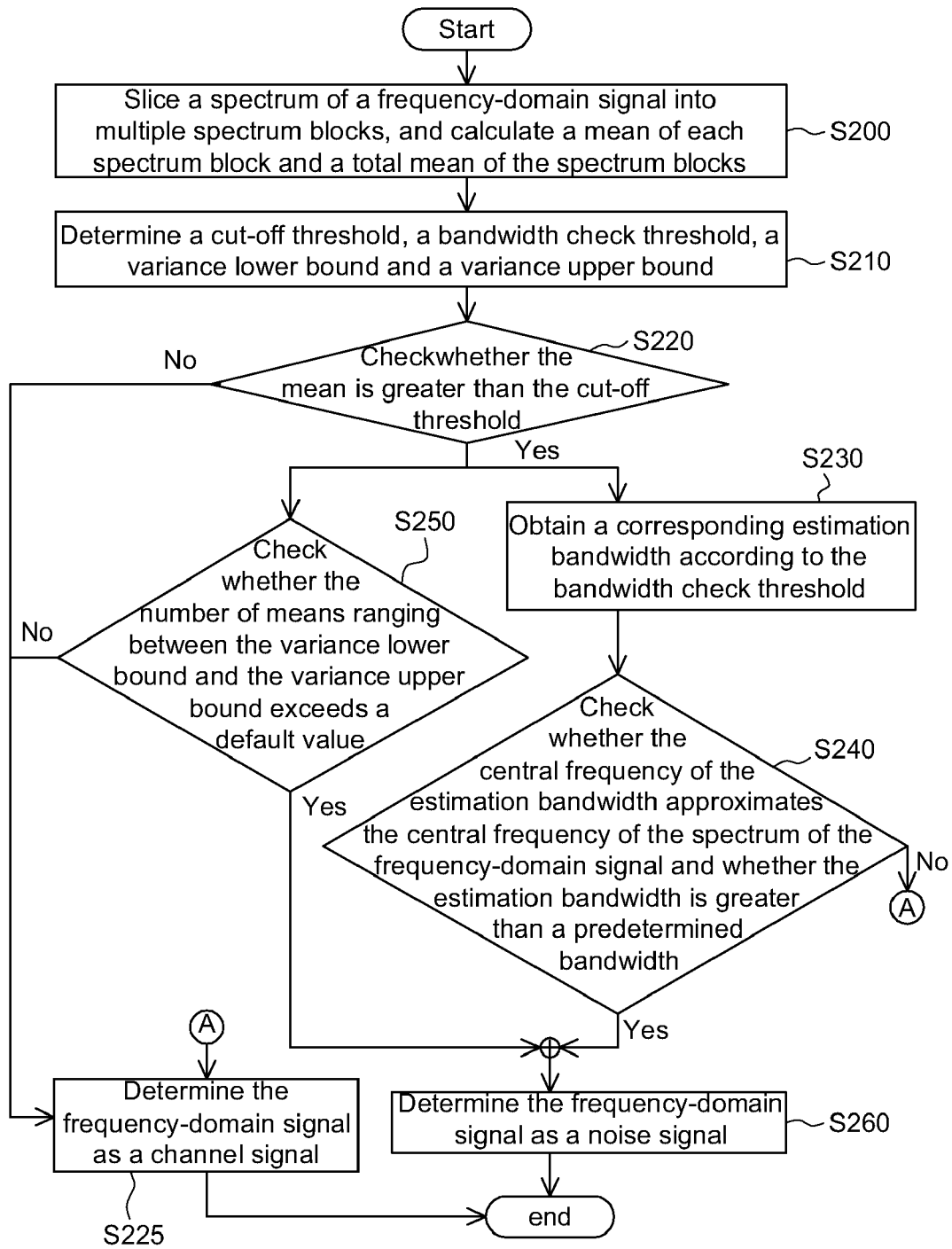
FIG. 2 is a flow chart showing a method for spectrum noise detection according to the preferred embodiment of the invention.

FIG. 2 is a flow chart showing a method for spectrum noise detection according to the preferred embodiment of the invention. In step S200, a spectrum of a frequency-domain signal is sliced into multiple spectrum blocks, and a mean of each spectrum block and a total mean of the spectrum blocks are calculated. The frequency-domain signal is, for example, a radio frequency signal, which is obtained by down-sampling by the tuner 110 followed by, without limitation to, the fast Fourier transform or the discrete Fourier transform. In the following non-restrictive example, it is assumed that the spectrum of the frequency-domain signal is sliced into 32 spectrum blocks. In the step S200, an amplitude mean of each spectrum block is substantially calculated so that 32 means $M_1$ to $M_{32}$ are obtained and respectively stored into 32 buffers. Thereafter, the means $M_1$ to $M_{32}$ are read from the buffers, and the total mean ($M_{av}=(M_1+M_2+ \ldots +M_{31}+M_{32})/32$) is calculated.

In step S210, a cut-off threshold, a bandwidth check threshold, a variance lower bound and a variance upper bound, which are sorted in an ascending manner, are determined according to the total mean $M_{av}$. In one non-restrictive example, the cut-off threshold is equal to 0.2 times of the total mean $M_{av}$, the bandwidth check threshold is equal to 0.8 times of the total mean $M_{av}$, the variance lower bound is equal to 0.9 times of the total mean $M_{av}$, and the variance upper bound is equal to 1.1 times of the total mean $M_{av}$. The basis for the determination of the cut-off threshold, the bandwidth check threshold, the variance lower bound and the variance upper bound will be described in the following.

In step S220, whether the means $M_1$ to $M_{32}$ are greater than the cut-off threshold is determined. If any one of the means $M_1$ to $M_{32}$ is smaller than or equal to the cut-off threshold, then step S225 is entered to determine the frequency-domain signal as a channel signal. If all the means $M_1$ to $M_{32}$ are greater than the cut-off threshold, steps S230 and S250 are respectively performed. In the step S230, a corresponding estimation bandwidth is obtained according to the bandwidth check threshold. In the step S230, whether the means $M_1$ to $M_{32}$ are greater than the bandwidth check threshold are successively checked. When one of the means $M_1$ to $M_{32}$ is greater than the bandwidth check threshold at the first time, the mean is a first mean, and a spectrum block corresponding to the first mean is defined as a starting block.

Thereafter, when another mean of the means $M_1$ to $M_{32}$ after the first mean is smaller than the bandwidth check threshold at the first time, then the mean is a second mean, and a spectrum block corresponding to the second mean is defined as an ending block. Thereafter, the estimation bandwidth is determined according to the starting block and the ending block, and the central frequency of the estimation bandwidth is obtained. After the central frequency of the estimation bandwidth is obtained, step S240 is entered to check whether the central frequency of the estimation bandwidth approximates the central frequency of the spectrum of the frequency-domain signal and whether the estimation bandwidth is greater than a predetermined bandwidth. If the central frequency of the estimation bandwidth deviates from the central frequency of the spectrum of the frequency-domain signal or the estimation bandwidth is smaller than the predetermined bandwidth, then the step S225 is entered to determine the frequency-domain signal as a channel signal.

In addition, in the step S250, whether the number of the means $M_1$ to $M_{32}$ ranging between the variance lower bound and the variance upper bound exceeds a default value is checked. If the number of the means $M_1$ to $M_{32}$ ranging between the variance lower bound and the variance upper bound does not exceed the default value, the step S225 is entered to determine the frequency-domain signal as the channel signal. If the central frequency of the estimation bandwidth is determined as approximating the central frequency of the spectrum of the frequency-domain signal and the estimation bandwidth is determined as being greater than the predetermined bandwidth in the step S240, and the number of the means $M_1$ to $M_{32}$ ranging between the variance lower bound and the variance upper bound is determined as exceeding the default value in the step S250, then step S260 is entered to determine the frequency-domain signal as a noise signal.

Figure 3A:
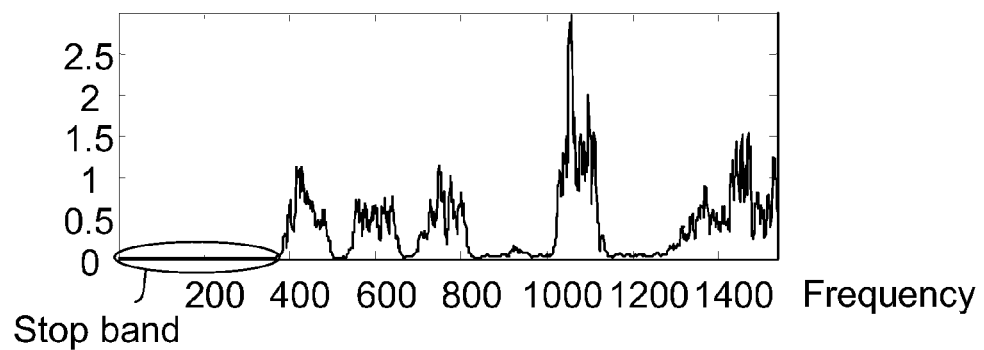
FIG. 3A is a schematic illustration showing a spectrum of an example of a channel signal.
Figure 3B:
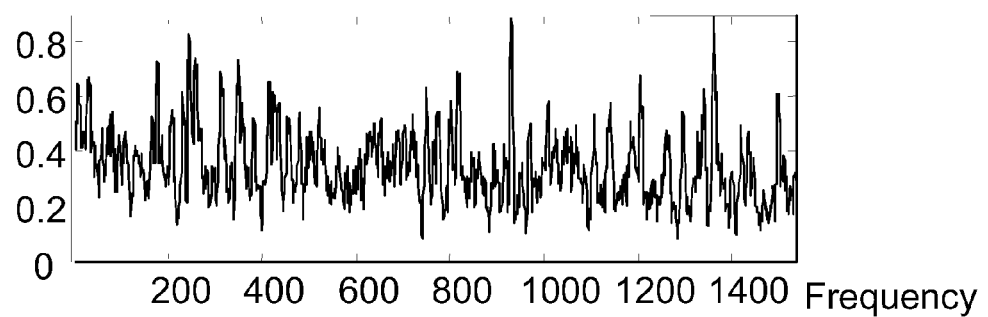
FIG. 3B is a schematic illustration showing a spectrum of an example of a noise signal.
Figure 3C:
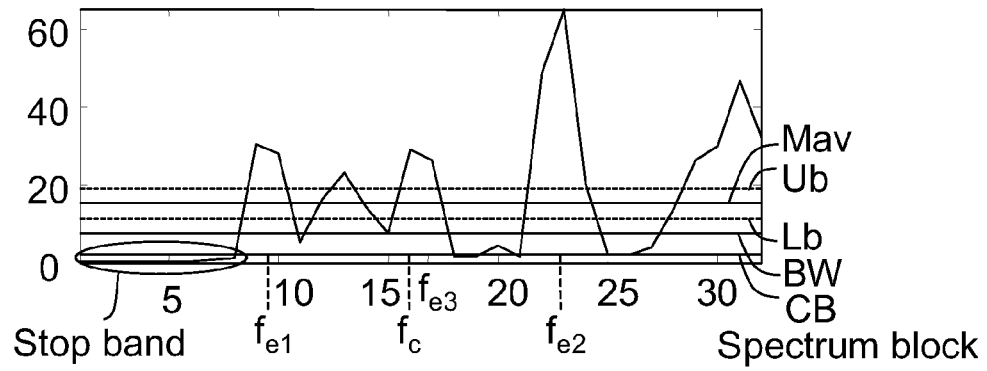
FIG. 3C is a schematic illustration showing means of spectrum blocks of the channel signal according to the preferred embodiment of the invention.
Figure 3D:
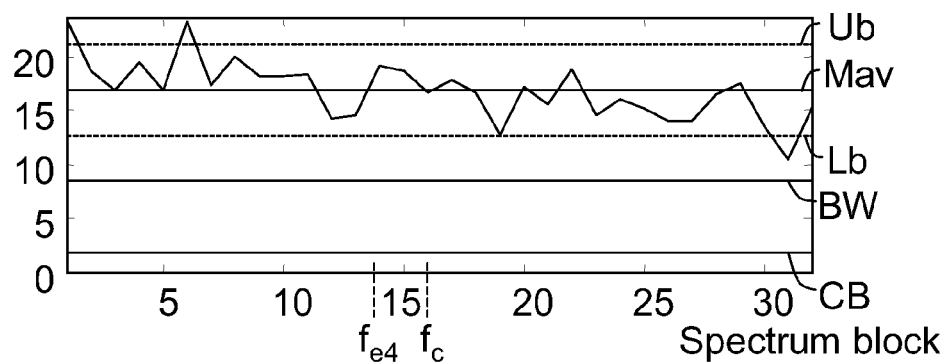
FIG. 3D is a schematic illustration showing means of spectrum blocks of the noise signal according to the preferred embodiment of the invention.

In the following, the basis for the determination of the cut-off threshold, the bandwidth check threshold, the variance lower bound and the variance upper bound in the step S210 will be described. FIG. 3A is a schematic illustration showing a spectrum of an example of a channel signal. FIG. 3B is a schematic illustration showing a spectrum of an example of a noise signal. FIG. 3C is a schematic illustration showing means of spectrum blocks of the channel signal according to the preferred embodiment of the invention. FIG. 3D is a schematic illustration showing means of spectrum blocks of the noise signal according to the preferred embodiment of the invention. As shown in FIGS. 3A to 3D, the cut-off threshold CB is set to be equal to 0.2 times of the total mean $M_{av}$ in this embodiment because only the channel signal has the stop band but the noise signal does not have the stop band. If any one of the means is smaller than the cut-off threshold CB, then the corresponding spectrum block may be regarded as the stop band. So, the frequency-domain signal may be determined as the channel signal.

In addition, it is obtained, according to FIGS. 3A to 3D, that most of the means of the noise signals may approximate the total mean $M_{av}$. On the contrary, the variation of the means of the channel signals is greater, and the means do not have to approximate the total mean $M_{av}$. Thus, in this embodiment, the variance lower bound Lb is set to be equal to 0.9 times of the total mean $M_{av}$, and the variance upper bound Ub is set to be equal to 1.1 times of the total mean $M_{av}$. Consequently, it is possible to simply determine whether the frequency-domain signal is the channel signal by checking the number of the means ranging between the variance lower bound Lb and the variance upper bound Ub.

Figure 4:
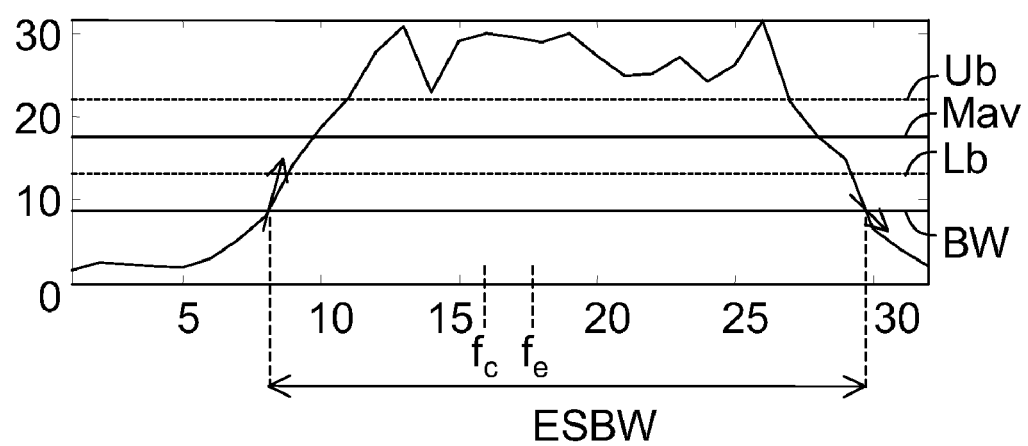
FIG. 4 is a schematic illustration showing an estimation bandwidth according to the preferred embodiment of the invention.

FIG. 4 is a schematic illustration showing an estimation bandwidth according to the preferred embodiment of the invention. According to FIGS. 3A and 3C, it is obtained that the spectrum of the noise signal almost occupies all the bandwidths of the frequency-domain signal, and the channel signal does not. In FIG. 4, the estimation bandwidth ESBW may be estimated, and the central frequency $f_e$ of the estimation bandwidth ESBW may be obtained by finding one mean greater than the bandwidth check threshold at the first time, and then another mean smaller than the bandwidth check threshold at the first time. Thereafter, whether the central frequency $f_e$ of the estimation bandwidth ESBW approximates the central frequency $f_c$ of the spectrum of the frequency-domain signal and whether the estimation bandwidth ESBW is greater than the predetermined bandwidth are checked. If the central frequency $f_e$ of the estimation bandwidth ESBW approximates the central frequency $f_c$ of the spectrum of the frequency-domain signal and the estimation bandwidth ESBW is greater than the predetermined bandwidth, then the frequency-domain signal is a noise signal. As shown in FIGS. 3A to 3D, it is also observed that the central frequencies $f_{e1}$ and $f_{e2}$ of the estimation bandwidth ESBW of the channel signal also deviate from the central frequency $f_c$ of the spectrum of the frequency-domain signal. Although the central frequency $f_{e3}$ approximates the central frequency $f_c$ of the spectrum, the estimation bandwidth ESBW corresponding to the central frequency $f_{e3}$ is substantially smaller than the predetermined bandwidth so that the determination cannot be incorrectly made. In addition, the central frequency $f_{e4}$ of the estimation bandwidth ESBW of the noise signal approximates the central frequency $f_c$ of the spectrum of the frequency-domain signal, and the estimation bandwidth ESBW of the noise signal is greater than the predetermined bandwidth.

Consequently, the noise detector 140 of this embodiment can eliminate the spectrum noise according to the relative relationships between the means of the spectrum blocks of the frequency-domain signal and the cut-off threshold, the bandwidth check threshold, the variance lower bound and the variance upper bound. So, it is possible to prevent the demodulator 120 from performing the unnecessary processing on the noise signal and thus prevent the overall performance from being wasted.

The method for spectrum noise detection according to the embodiment of the invention has many advantages, some of which will be described in the following.

The method for spectrum noise detection according to the invention can determine whether the received signal is the channel signal or the noise signal in advance according to the relative relationships between the means of the spectrum blocks of the frequency-domain signal and the cut-off threshold, the bandwidth check threshold, the variance lower bound and the variance upper bound. So, the spectrum noise can be eliminated in advance and the overall performance of the receiver can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for spectrum noise detection using a receiver, comprising: slicing a spectrum of a frequency-domain signal into a plurality of spectrum blocks, and calculating an amplitude mean of each of the spectrum blocks and an average amplitude mean of the spectrum blocks; determining a cut-off threshold, a bandwidth check threshold that is amplitude threshold of spectrum bandwidth estimation, a variance lower bound and a variance upper bound that is upper bound and lower bound amplitude threshold of spectrum variance estimation, which are sorted in an ascending manner, according to the average amplitude; checking whether the amplitude mean is greater than the cut-off threshold; checking whether the amplitude mean range between the variance lower bound and the variance upper bound if the amplitude mean is greater than the cut-off threshold, and obtaining an estimation bandwidth corresponding to the spectrum blocks according to the bandwidth check threshold, and checking whether a central frequency of the estimation bandwidth approximates a central frequency of the spectrum of the frequency-domain signal and whether the estimation bandwidth is greater than a predetermined bandwidth; and determining the frequency-domain signal as a noise signal if the amplitude mean ranging between the variance lower bound and the variance upper bound exceeds a default value, and the central frequency of the estimation bandwidth approximates the central frequency of the spectrum of the frequency-domain signal and the estimation bandwidth is greater than the predetermined bandwidth.

2. The method according to claim 1, wherein the cut-off threshold is equal to 0.2 times of the average amplitude mean.

3. The method according to claim 1, wherein the bandwidth check threshold is equal to 0.8 times of the average amplitude mean.

4. The method according to claim 1, wherein the variance lower bound is equal to 0.9 times of the average amplitude mean, and the variance upper bound is equal to 1.1 times of the average amplitude mean.

5. The method according to claim 1, further comprising: determining the frequency-domain signal as a channel signal if any one of the amplitude mean is smaller than or equal to the cut-off threshold.

6. The method according to claim 1, further comprising: successively checking whether the amplitude mean is greater than the bandwidth check threshold; defining a spectrum block corresponding to a first amplitude mean as a starting block when the first amplitude mean is greater than the bandwidth check threshold; defining the spectrum block corresponding to a second amplitude mean as an ending block when the second amplitude mean following the first amplitude mean is smaller than the bandwidth check threshold; and determining the estimation bandwidth according to the starting block and the ending block, and obtaining the central frequency of the estimation bandwidth.

7. The method according to claim 1, further comprising: determining the frequency-domain signal as a channel signal if the amplitude mean ranging between the variance lower bound and the variance upper bound does not exceed the default value.

8. The method according to claim 1, further comprising: determining the frequency-domain signal as a channel signal if the central frequency of the estimation bandwidth deviates from the central frequency of the spectrum of the frequency-domain signal or the estimation bandwidth is smaller than the predetermined bandwidth.

* * * * *